US012663610B2

(12) United States Patent
Lai et al.

(10) Patent No.: US 12,663,610 B2
(45) Date of Patent: Jun. 23, 2026

(54) OPTICAL LENS

(71) Applicant: Taiwan ZMAX Optech Co., Ltd., Hsinchu County (TW)

(72) Inventors: Sheng-Tang Lai, Hsinchu County (TW); Wei-Ting Chiu, Hsinchu County (TW); Yuan-Long Cai, Hsinchu County (TW); Chia-Chen Kung, Hsinchu County (TW); Cheng-Chien Hsieh, Hsinchu County (TW)

(73) Assignee: Taiwan ZMAX Optech Co., Ltd., Hsinchu County (TW)

( * ) Notice: Subject to any disclaimer, the term of this patent is extended or adjusted under 35 U.S.C. 154(b) by 250 days.

(21) Appl. No.: 18/636,220

(22) Filed: Apr. 15, 2024

(65) Prior Publication Data

US 2025/0321397 A1      Oct. 16, 2025

(51) Int. Cl.
*G02B 13/08* (2006.01)
*G02B 9/04* (2006.01)
*G02B 13/18* (2006.01)

(52) U.S. Cl.
CPC .............. *G02B 9/04* (2013.01); *G02B 13/18* (2013.01)

(58) Field of Classification Search
None
See application file for complete search history.

(56) References Cited

U.S. PATENT DOCUMENTS

| | | | | |
|---|---|---|---|---|
| 10,126,533 | B1 * | 11/2018 | Caldwell | ................. G02B 9/64 |
| 2007/0133107 | A1 | 6/2007 | Ohzawa et al. | |
| 2016/0103302 | A1 * | 4/2016 | Neil | .................. G02B 15/1455 |
| | | | | 359/670 |
| 2019/0179115 | A1 | 6/2019 | Hudyma et al. | |
| 2021/0116686 | A1 * | 4/2021 | Li | ............................ G02B 9/64 |
| 2022/0244503 | A1 * | 8/2022 | Wang | ....................... G02B 9/64 |
| 2023/0273428 | A1 * | 8/2023 | Neil | .................. G02B 27/0075 |
| | | | | 348/345 |
| 2024/0053589 | A1 * | 2/2024 | Schultz | ................. G02B 13/18 |

FOREIGN PATENT DOCUMENTS

| | | |
|---|---|---|
| TW | 200745593 A | 12/2007 |
| TW | 202305439 A | 2/2023 |

* cited by examiner

*Primary Examiner* — Darryl J Collins

(74) *Attorney, Agent, or Firm* — Li & Cai Intellectual Property Office

(57) ABSTRACT

An optical lens is provided, including a front lens group, a rear lens group, and an aperture. The front lens group includes a plurality of front lens elements sequentially arranged from an object side to an image side, and a second lens and a third lens in the plurality of front lens elements are non-rotationally symmetrical lenses. The rear lens group includes at least one rear lens element, and the at least one rear lens element is a cemented lens. The aperture is located between the front lens group and the rear lens group. The half field of view angle of the optical lens is greater than 90° in a horizontal direction and a vertical direction, and the optical lens satisfies the following relationships: EFLX/EFLY>1.1; EFLY/F2Y−EFLX/F2X<−5%; and EFLY/F3Y−EFLX/F3X>5%.

9 Claims, 9 Drawing Sheets

OPTICAL LENS

FIELD OF THE DISCLOSURE

The present disclosure relates to optical lenses, and more particularly to an optical lens using non-rotationally symmetric lenses to improve pixel utilization.

BACKGROUND OF THE DISCLOSURE

Due to a short focal length (less than 35 mm), a wide-angle lens can capture images in a wide range, and can be used to enlarge a small space and present a distorted view because of the wider range. The ultra-wide angle lens, also known as the fisheye lens, is characterized by its ability to capture an even wider range than the wide-angle lens.

However, the existing fisheye lens uses a circular lens, so that the image circle presented is circular, and the pixel utilization cannot be fully utilized.

SUMMARY OF THE DISCLOSURE

In response to the above-referenced technical inadequacies, the present disclosure provides an optical lens.

In order to resolve the aforementioned technical problem, one of the technical solutions provided by the present disclosure provides an optical lens, including: a front lens group, a rear lens group and an aperture. The front lens group includes a plurality of front lens elements sequentially arranged from an object side to an image side, and a second lens and a third lens in the plurality of front lens elements are non-rotationally symmetrical lenses. The rear lens group includes at least one rear lens element, and the at least one rear lens element is a cemented lens. The aperture is located between the front lens group and the rear lens group. The half field of view angle of the optical lens is greater than 90° in a horizontal direction and a vertical direction, and the optical lens satisfies the following relationships: EFLX/EFLY>1.1; EFLY/F2Y−EFLX/F2X<−5%; and EFLY/F3Y−EFLX/F3X>5%, in which EFLX is an effective focal length of the optical lens in a horizontal direction, EFLY is an effective focal length of the optical lens in a vertical direction, F2X is an effective focal length of the second lens in a horizontal direction, F2Y is an effective focal length of the second lens in a vertical direction, F3X is an effective focal length of the third lens in a horizontal direction, and F3Y is an effective focal length of the third lens in a vertical direction.

In one of the possible or preferred embodiments, the plurality of front lens elements include a first front lens, a second front lens, a third front lens, a fourth front lens and a fifth front lens arranged sequentially from the object side to the image side, the second front lens and the third front lens are rotationally asymmetric lenses, the third front lens has a convex surface facing the object side, and the fourth front lens has a convex surface facing the image side.

In one of the possible or preferred embodiments, the first front lens and the fifth front lens are made of glass.

In one of the possible or preferred embodiments, the fourth front lens is an aspherical lens.

In one of the possible or preferred embodiments, the rear lens group includes a plurality of rear lens elements, the plurality of rear lens elements include a first rear lens and a second rear lens arranged sequentially from the object side to the image side, and the first rear lens is a cemented lens.

In one of the possible or preferred embodiments, the first rear lens includes a front lens piece, an intermediate lens and a rear lens piece, the front lens piece is connected to one side of the intermediate lens, and the rear lens piece is connected to another side of the intermediate lens.

In one of the possible or preferred embodiments, the second rear lens is an aspherical lens.

In one of the possible or preferred embodiments, the optical lens satisfies the following relationship: H90/H10>1.3, in which H90 is an imaging width of a half field of view angle of 80°-90° in a horizontal direction, and H10 is an imaging width of a half field of view angle of 0°-10° in a horizontal direction.

In one of the possible or preferred embodiments, the optical lens satisfies the following relationship: V90/V10>1.05, in which V90 is an imaging width with a half field of view angle of 80° to 90° in a vertical direction, and V10 is an imaging width with a half field of view angle of 0° to 10° in a vertical direction.

In one of the possible or preferred embodiments, each non-rotationally symmetric lens satisfies the following relationship:

$$Z = \frac{cr^2}{1 + \sqrt{1 - (1 + K)c^2 r^2}} + \sum_{j=2}^{66} c_j x^p y^q$$

$$j = \frac{(p+q)^2 + p + 3q}{2} + 1$$

in which c is a vertex curvature, K is a cone constant, and cj is a coefficient.

One of the beneficial effects of the present disclosure is that an optical lens provided by the present disclosure can improve pixel utilization by virtue of the technical solution of "a front lens group including a plurality of front lens elements sequentially arranged from an object side to an image side, a second lens and a third lens in the plurality of front lens elements being non-rotationally symmetrical lenses, a rear lens group including at least one rear lens element, the at least one rear lens element being a cemented lens, an aperture located between the front lens group and the rear lens group, a half field of view angle of the optical lens being greater than 90° in a horizontal direction and a vertical direction, and the optical lens satisfying the following relationships: EFLX/EFLY>1.1; EFLY/F2Y−EFLX/F2X<−5%; and EFLY/F3Y−EFLX/F3X>5%, in which EFLX is an effective focal length of the optical lens in a horizontal direction, EFLY is an effective focal length of the optical lens in a vertical direction, F2X is an effective focal length of the second lens in a horizontal direction, F2Y is an effective focal length of the second lens in a vertical direction, F3X is an effective focal length of the third lens in a horizontal direction, and F3Y is an effective focal length of the third lens in a vertical direction".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
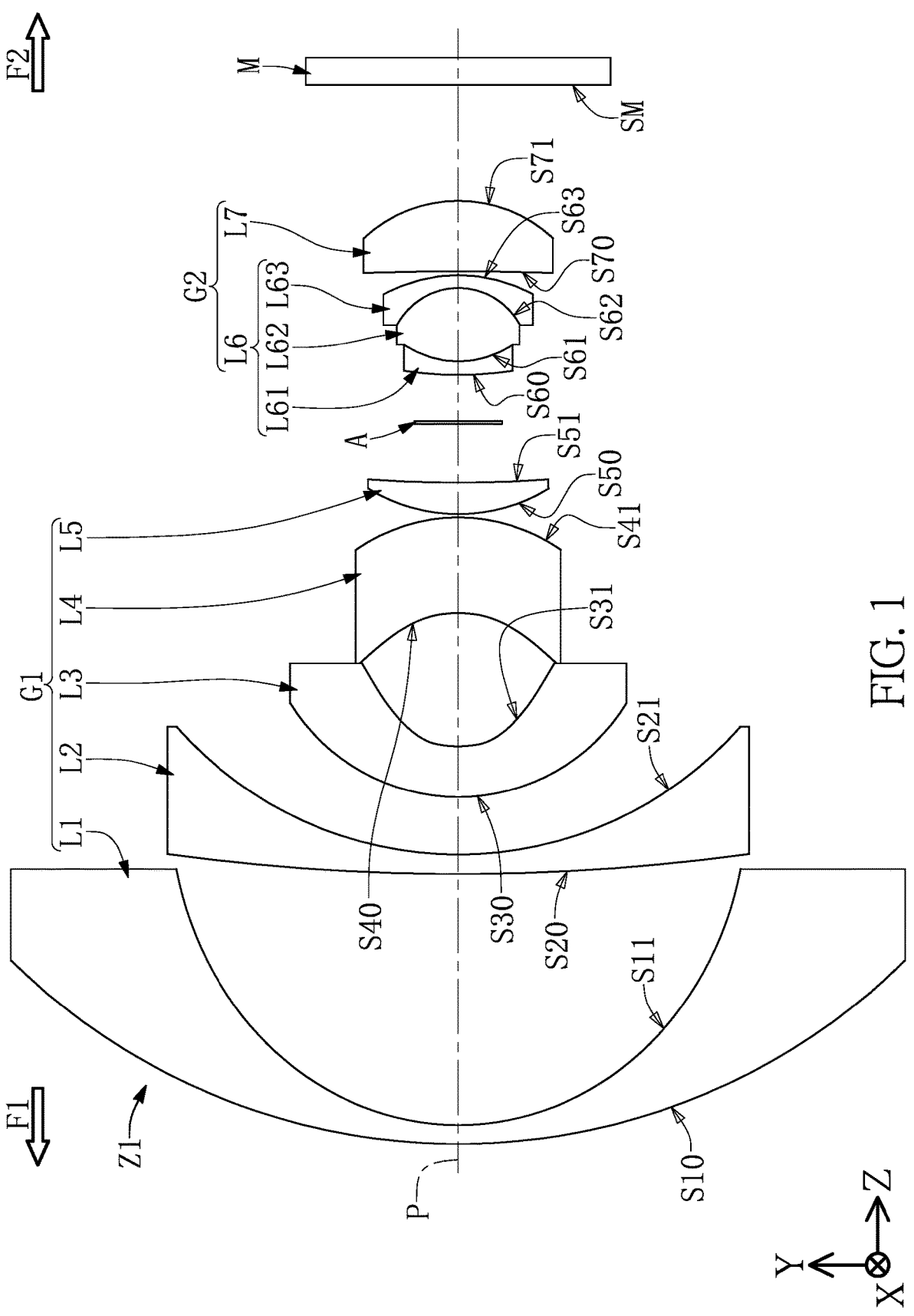
FIG. 1 is a schematic structural configuration diagram of an optical lens from one viewing angle according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether or not a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
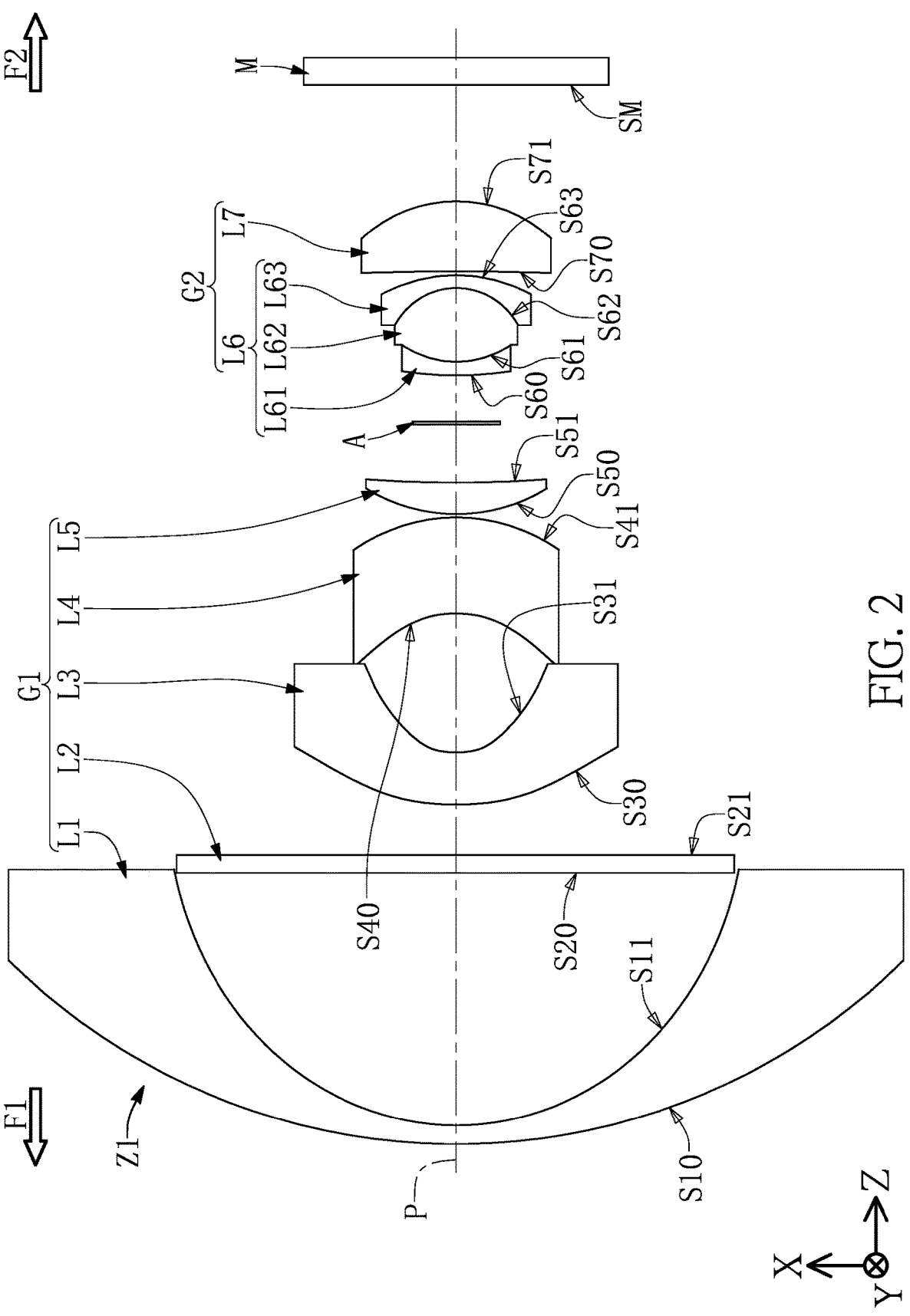
FIG. 2 is a schematic structural configuration diagram of the optical lens from another perspective according to the first embodiment of the present disclosure.

Reference is made to FIG. 1 and FIG. 2. FIG. 1 is schematic structural configuration diagram of an optical lens from one viewing angle according to a first embodiment of the present disclosure, and FIG. 2 is a schematic structural configuration diagram of the optical lens from another perspective according to the first embodiment of the present disclosure.

As shown in FIG. 1 and FIG. 2, an optical lens Z1 of the present disclosure may have an optical axis P. The optical lens Z1 may include a front lens group G1, a rear lens group G2 and an aperture A. The front lens group G1, the aperture A, and the rear lens group G2 are arranged sequentially from an object side F1 to an image side F2. The object side F1 can be the side where light enters the optical lens Z1, and the image side F2 can be the side where the light outputs the optical lens Z1. The light entering the optical lens Z1 can be transmitted from the object side F1 toward the image side F2 and imaged to an imaging element M (such as, Charge-coupled Device (CCD), but the present disclosure is not limited thereto). FIG. 1 shows a schematic cross-sectional view of the optical lens Z1 in the Y-Z direction, and FIG. 2 shows a schematic cross-sectional view of the optical lens Z1 in the X-Z direction. Further, the X direction is a direction parallel to one side of the imaging element M, and the Y direction is a direction parallel to another side of the imaging element M, the Z direction is a direction parallel to the optical axis P, and the X direction, the Y direction and the Z direction are perpendicular to each other. It is worth noting that in the present embodiment, the imaging element M can be rectangular (such as rectangular or square, but the present disclosure is not limited thereto), but the present disclosure is not limited thereto. The imaging element M can also be circular. If the imaging element M is a circle, the X direction and the Y direction can correspond to the two mutually perpendicular diameters of the imaging element M. Furthermore, FIG. 1 can also be represented as a plane including the optical axis and parallel to the Y direction and the Z direction, and FIG. 2 can also be represented as a plane containing the optical axis and parallel to the X direction and the Z direction.

The front lens group G1 may include a plurality of front lens elements, and the plurality of front lens elements may include at least two non-rotationally symmetric lenses. In the present embodiment, the plurality of front lens elements may include a first front lens L1, a second front lens L2, a third front lens L3, a fourth front lens L3, a fourth front lens L4 and a fifth front lens L5 arranged sequentially from the object side F1 to the image side F2. The second front lens L2 and the third front lens L3 may be non-rotationally symmetric lenses. The second front lens L2 and the third front lens L3 may be XY Polynomial lenses, or the second front lens L2 may be a cylindrical lens. The fourth front lens may be an aspherical lens. The third front lens L3 may have a convex surface facing the object side F1, and the fourth front lens L4 may have a convex surface facing the image side F2. The first front lens L1 and the fifth front lens L5 can be made of glass, and the second front lens L2, and the third front lens L3 and the fourth front lens L4 can be made of plastic. The present disclosure is not limited thereto.

All the free-form surfaces of the second front lens L2 and the third front lens L3 of the present disclosure have shapes that are symmetrical with respect to the X-Z plane and the Y-Z plane respectively (as shown in FIG. 1 and FIG. 2), and a center of the free-form surface can be identified. Therefore, the second front lens L2 and the third front lens L3 of the present disclosure have the advantage that their shapes can be easily managed during manufacturing.

The rear lens group may include at least one rear lens element, and the at least one rear lens element may be a cemented lens. In the present embodiment, the rear lens group G2 may include a plurality of rear lens elements, and the plurality of rear lens elements may include a first rear lens L6 and a second rear lens L7 arranged sequentially from an object side to an image side. The first rear lens L6 can be a three-cemented lens, that is, the first rear lens L6 can include a front lens piece L61, an intermediate lens L62 and a rear lens piece L63. The front lens piece L61 is connected to one side of the intermediate lens L62, and the rear lens piece L63 is connected to the other side of the middle lens L62. The second rear lens L7 can be an aspherical lens. The first rear lens L6 and the second rear lens L7 can be made of plastic material, but the present disclosure is not limited thereto. When the present disclosure is actually implemented, at least one of the first rear lens L6 and the second rear lens L7 can also be made of a glass material.

Furthermore, in the present embodiment, a total number of lenses of the optical lens Z1 can be ranging from six to eight, which has a best and better cost-effectiveness. The preferred number is seven, but the present disclosure is not limited thereto. A number of free-form lenses of the optical lens Z1 of the present disclosure can be two, a number of aspherical lenses of the optical lens Z1 of the present disclosure can be two, and a number of cemented lenses of the optical lens Z1 of the present disclosure can be one, but the present disclosure is not limited thereto. In addition, the optical lens Z1 of the present disclosure has at least three lens elements that are rotationally symmetrical with respect to the optical axis P. By reducing the number of free-form lenses, the bias in performance due to directions can be reduced.

Therefore, in the present embodiment, the optical lens Z1 can be a fisheye lens with a half field of view angle of 80° or more, so that it can cover a wide viewing angle. Compared with the conventional fisheye lens, the optical lens Z1 of the present disclosure is capable of imaging adjacent to diagonal corners of the imaging element M by providing a non-rotationally symmetric lens (i.e., a free-form lens).

Furthermore, the optical lens Z1 of the present disclosure can have a half field of view angle greater than 90° in both a horizontal direction and a vertical direction, so it can cover a wide viewing angle, and the optical lens Z1 of the present disclosure satisfies the following relationship:

$$EFLX/EFLY > 1.1; \quad (1)$$

$$EFLY/F2Y - EFLX/F2X < -5\%; \quad (2)$$

$$EFLY/F3Y - EFLX/F3X > 5\%. \quad (3)$$

In the above relationships (1), (2) and (3), EFLX can be an effective focal length of the lens in the horizontal direction, EFLY can be an effective focal length of the lens in the vertical direction, and F2X can be the second lens of the front lens group. (i.e., the effective focal length of the second front lens L2) in the horizontal direction, F2Y can be an effective focal length of the second lens in the front lens group in the vertical direction, and F3X can be an effective focal length of the third lens of the front lens group (i.e., the third front lens L3) in the horizontal direction, and F3Y can be an effective focal length of the third lens of the front lens group in the vertical direction. Furthermore, in the present embodiment, various parameters of the optical lens Z1 are preferably as shown in Table 1 below, but the present disclosure is not limited thereto. Therefore, a numerical value obtained by the optical lens Z1 of the present disclosure sure according to the relationship (1) is 1.13, a numerical value obtained according to the relationship (2) is −8.1%, and a numerical value obtained according to the relationship (3) is 9.2%.

TABLE I

| | | |
|---|---|---|
| EFLX | 1.758 | |
| EFLY | 1.561 | |
| F2_X(F2X) | 1.00E+04 | 0.0% |
| F2_Y(F2Y) | −19.196 | −8.1% |
| F3_X(F3X) | −6.39 | −27.5% |
| F3_Y(F3Y) | −8.54 | −18.3% |

Furthermore, the optical lens Z1 of the present disclosure can also satisfy the following relationship:

$$H90/H10 > 1.3. \quad (4)$$

In the above relationship (4), H90 can be an imaging width with a half field of view angle of 80° to 90° in a horizontal direction, and H10 can be an imaging width with a half field of view angle of 0° to 10° in a horizontal direction.

In addition, the optical lens Z1 of the present disclosure can also satisfy the following relationship:

$$V90/V10 > 1.05. \quad (5)$$

In the above relationship (5), V90 can be an imaging width with a half field of view angle of 80° to 90° in a vertical direction, and V10 can be an imaging width with a half field of view angle of 0° to 10° in a vertical direction.

According to the above content, an actual surface design of each lens of the optical lens Z1 of the present disclosure can be seen in Table 1 below.

TABLE I

| Surface | Type | Radius of Curvature (mm) | Thickness (mm) | Material refractive index (Nd) | Material Abbe number (Vd) |
|---|---|---|---|---|---|
| S10 | Spherical | 22.4 | 0.60 | 2.008 | 25.46 |
| S11 | Spherical | 9.5 | 7.32 | | |
| S20 | Cylinder | 75.4 | 0.55 | 1.838 | 42.72 |
| S21 | Cylinder | 13.2 | 1.68 | | |
| S30 | XY polynomial freeform surface | 10.3 | 1.54 | 1.537 | 55.66 |
| S31 | XY polynomial freeform surface | 2.3 | 3.96 | | |
| S40 | Aspheric | −3.5 | 2.85 | 1.537 | 55.66 |
| S41 | Aspheric | −5.3 | 0.12 | | |
| S50 | Spherical | 6.3 | 0.91 | 2.008 | 25.46 |
| S51 | Spherical | 58.2 | 1.74 | | |
| Aperture A | Spherical | Infinite | 1.47 | | |
| S60 | Spherical | 21.6 | 0.40 | 1.814 | 22.76 |
| S61 | Spherical | 3.6 | 2.16 | 1.594 | 68.62 |
| S62 | Spherical | −2.4 | 0.40 | 1.931 | 20.88 |
| S63 | Spherical | −5.5 | 0.10 | | |

TABLE I-continued

| surface | surface type | radius of curvature (mm) | thickness (mm) | material refractive index (Nd) | material Abbe number (Vd) |
|---|---|---|---|---|---|
| S70 | Aspheric | 73.2 | 2.12 | 1.537 | 55.66 |
| S71 | Aspheric | −5.0 | 4.00 | | |
| SM | Spherical | Infinite | | | |

| surface | surface type | radius of curvature (mm) | thickness (mm) | material refractive index (Nd) | material Abbe number (Vd) |
|---|---|---|---|---|---|
| S10 | spherical surface | 22.4 | 0.60 | 2.008 | 25.46 |
| S11 | spherical surface | 9.5 | 7.32 | | |
| S20 | cylinder | 75.4 | 0.55 | 1.838 | 42.72 |
| S21 | cylinder | 13.2 | 1.68 | | |
| S30 | XY polynomial freeform surface | 10.3 | 1.54 | 1.537 | 55.66 |
| S31 | XY polynomial freeform surface | 2.3 | 3.96 | | |
| S40 | aspherical | −3.5 | 2.85 | 1.537 | 55.66 |
| S41 | aspherical | −5.3 | 0.12 | | |
| S50 | spherical surface | 6.3 | 0.91 | 2.008 | 25.46 |
| S51 | spherical surface | 58.2 | 1.74 | | |
| aperture A | spherical surface | unlimited | 1.47 | | |
| S60 | spherical surface | 21.6 | 0.40 | 1.814 | 22.76 |
| S61 | spherical surface | 3.6 | 2.16 | 1.594 | 68.62 |
| S62 | spherical surface | −2.4 | 0.40 | 1.931 | 20.88 |
| S70 | Aspherical | 73.2 | 2.12 | 1.537 | 55.66 |
| S71 | Aspherical | −5.0 | 4.00 | | |
| SM | spherical surface | Unlimited | | | |

Reference is made to FIG. 1, FIG. 2 and Table 1. In the present embodiment, the first front lens L1 of the optical lens Z1 has a surface S10 and a surface S11 sequentially from the object side F1 to the image side F2, the third front lens L3 has a surface S30 and a surface S31 sequentially from the object side F1 to the image side F2, and the surface S30 and the surface S31 are free-form surfaces of XY polynomials, and so on. The surfaces corresponding to each element will not be described again.

It is worth noting that the interval in Table 1 is a distance between the surface from the object side F1 to a next surface on the image side F2. That is to say, a thickness of the first front lens L1 is 0.6 mm, a thickness of the second front lens L2 is 0.55 mm, and the distance between the adjacent surfaces of the first front lens L1 and the second front lens L2 is 7.32 mm, and so on, and will not be repeated herein.

Moreover, a radius of curvature in Table 1 is the radius of curvature of the surface, and its positive and negative values represent a direction of curvature. For example, the radius of curvature of the surface S10 of the first front lens L1 is positive, and the radius of curvature of the surface S11 of the first front lens L1 is positive. Therefore, the first front lens L1 is a convex-concave lens. For example, the curvature radius of the surface S70 of the second rear lens L7 is positive, and the curvature radius of the surface S71 of the second rear lens L7 is negative. Therefore, the second rear lens L7 is a biconvex lens and so on, and will not be repeated herein.

Further, Table 2 below lists a quadratic surface coefficient value K and the aspherical surface coefficients A to F of each order of the aspheric surfaces of the fourth front lens L4 and the second rear lens L7. The aspheric polynomial can be expressed by the following relationship (6):

$$X = \frac{CY^2}{1 + \sqrt{1 - (1+K)C^2Y^2}} + AY^4 + \qquad (6)$$
$$BY^6 + CY^8 + DY^{10} + EY^{12} + FY^{14} + GY^{16} + HY^{20};$$

$$C = \frac{1}{R}. \qquad (7)$$

In the above relationships (6) and (7), X can be the offset (sag) in the direction of the optical axis P, C can be the reciprocal of the radius of the oscillating sphere, which is the reciprocal of the radius of curvature close to the optical axis T, K can be the quadratic surface coefficient, Y can be the aspherical height, which is the height from the center of the lens to the edge of the lens, and A to H represent the aspherical coefficients of each order of the aspherical polynomial.

TABLE II

| | | surface | | | |
|---|---|---|---|---|---|
| | | S40 | S41 | S70 | S71 |
| conic coefficient | K | −1.2 | −0.9 | −66.0 | 0.02 |
| aspheric coefficient | A | 8.63E−06 | 5.74E−04 | −1.96E−03 | 8.94E−05 |
| | B | −1.86E−04 | −1.79E−05 | −6.80E−05 | −3.17E−04 |
| | C | 2.33E−05 | 5.19E−06 | 1.12E−05 | 1.48E−05 |
| | D | −7.21E−07 | −1.00E−07 | 3.37E−07 | −1.15E−06 |
| | E | 0.0E+00 | 0 | 0 | 7.72E−08 |
| | F | 0.0E+00 | 0 | 0 | 0 |

Furthermore, a depression amount Z of the surface parallel to the Z axis of each non-rotationally symmetric lens (i.e., XY Polynomial) of the optical lens Z1 of the present disclosure satisfies the following relationship:

$$Z = \frac{cr^2}{1 + \sqrt{1 - (1+K)c^2 r^2}} + \sum_{j=2}^{66} c_j x^p y^q \qquad (8)$$
$$j = \frac{(p+q)^2 + p + 3q}{2} + 1.$$

In the above relationship (8), c can be the vertex curvature, K can be the conic constant, cj can be the coefficient, r can be the radial distance of the lens and p and q can be the coefficients.

According to the above content, the data of the XY polynomial free-form surface of the third front lens L3 of the optical lens Z1 of the present disclosure can be seen in Table 3 below. C1 to C66 in Table 3 can be coefficients.

TABLE 3

| | S30 | S31 |
|---|---|---|
| C1 | 1.92 | −2.07 |
| C2 | 0 | 0 |
| C3 | 0 | 0 |
| C4 | 0 | −1.13E−02 |
| C5 | 0 | 0 |
| C6 | 0 | −5.00E−02 |

9

TABLE 3-continued

| | S30 | S31 |
|---|---|---|
| C7 | 0 | 0 |
| C8 | 0 | 0 |
| C9 | 0 | 0 |
| C10 | 0 | 0 |
| C11 | 2.00E-03 | 1.94E-02 |
| C12 | 0 | 0 |
| C13 | 8.00E-03 | 4.24E-02 |
| C14 | 0 | 0 |
| C15 | 5.00E-03 | 2.15E-02 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | -2.24E-03 | -6.89E-04 |
| C23 | 0 | 0 |
| C24 | -8.05E-04 | -2.19E-03 |
| C25 | 0 | 0 |
| C26 | -8.05E-04 | -1.95E-03 |
| C27 | 0 | 0 |
| C28 | -2.57E-04 | -6.37E-04 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 6.18E-06 | -5.14E-05 |
| C38 | 0 | 0 |
| C39 | 2.75E-06 | -1.74E-04 |
| C40 | 0 | 0 |
| C41 | 3.73E-05 | -2.78E-04 |
| C42 | 0 | 0 |
| C43 | 2.06E-05 | -1.90E-04 |
| C44 | 0 | 0 |
| C45 | 4.07E-06 | -3.94E-05 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | -6.72E-08 | 3.97E-06 |
| C57 | 0 | 0 |
| C58 | -3.55E-07 | 1.87E-05 |
| C59 | 0 | 0 |
| C60 | -6.06E-07 | 3.41E-05 |
| C61 | 0 | 0 |
| C62 | -4.24E-07 | 3.43E-05 |
| C63 | 0 | 0 |
| C64 | -9.67E-08 | 1.63E-05 |
| C65 | 0 | 0 |
| C66 | -9.35E-09 | 2.33E-06 |

Figure 5:
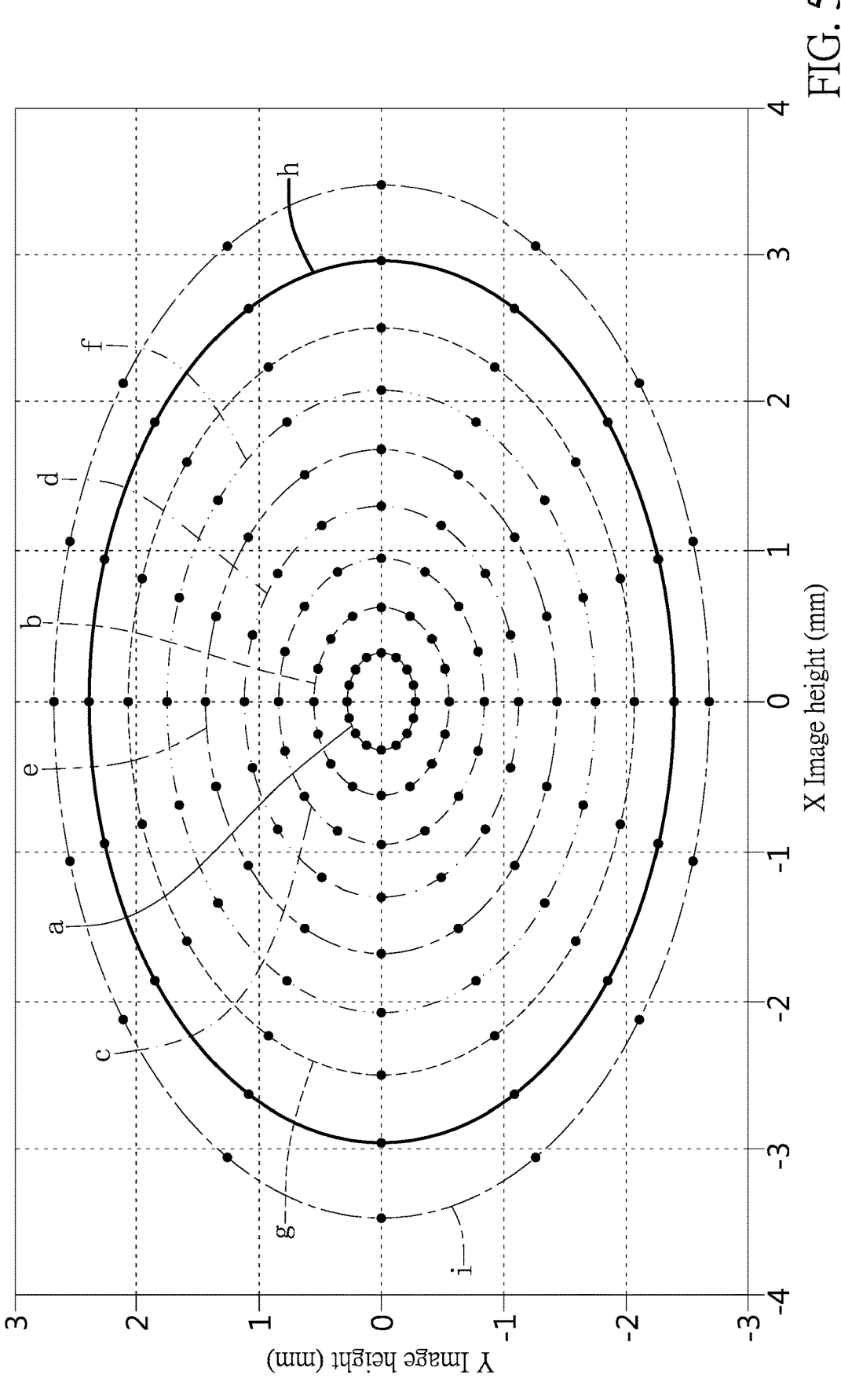
FIG. 5 is a schematic diagram of the relationship between a field of view angle and an image point of the optical lens according to the present disclosure.

Reference is made to FIG. 5. FIG. 5 is a diagram showing the relationship between the field of view (FOV) and the image point (Image height) of the optical lens Z1 of the present disclosure. In FIG. 5, with the optical axis P as the origin (0, 0), in the four quadrants of the image plane, image points are drawn at every 10° viewing angle. In FIG. 5, a represents the half field of view angle of 10 degrees, and b represents the half field of view angle of 20 degrees, and so on, and i means the half field of view angle is 90 degrees. Compared with a normal rotationally symmetrical lens, it can be seen that the optical lens Z1 of the present disclosure can enlarge the shape of the image surface, effectively utilize the area of the photosensitive surface of the rectangular imaging element M, and further make it possible to enlarge the peripheral portion away from the optical axis P. The image can be enlarged to be larger than the image in the central portion adjacent to the optical axis P. According to the above content, the imaging data in the vertical and horizontal directions of each half field of view angle of the optical lens Z1 of the present disclosure can be seen in Table 4 below. Therefore, the numerical value obtained by the optical lens Z1 of the present disclosure according to the relationship (4) is 1.11, and the numerical value obtained according to the relationship (5) is 1.64.

TABLE 4

| Half field of view angle (°) | Vertical direction (mm) | Horizontal direction (mm) |
|---|---|---|
| 0 | 0.000 | 0.000 |
| 10 | 0.273 | 0.308 |
| 20 | 0.550 | 0.624 |
| 30 | 0.835 | 0.954 |
| 40 | 1.132 | 1.306 |
| 50 | 1.443 | 1.683 |
| 60 | 1.762 | 2.084 |
| 70 | 2.084 | 2.507 |
| 80 | 2.400 | 2.959 |
| 90 | 2.703 | 3.465 |

Reference is made to FIG. 5 and Table 4 again. In the present embodiment, when the half field of view angle of the optical lens Z1 is 10 degrees, the imaging width in the vertical direction can be 0.273 mm, and the imaging width in the horizontal direction can be 0.308 mm, and so on, and the imaging widths of other half field of view angles in the vertical and horizontal directions will not be described again.

The optical lens Z1 of the present disclosure uses the above technical solution to introduce a non-rotationally symmetric lens (that is, a free-form lens that is asymmetrical with respect to the optical axis P) to make the EFL (effective focal length of the optical lens Z1) different in the horizontal/vertical direction, and thereby implement an elliptical image circle. Moreover, if the imaging element M (such as a sensor) is rectangular, an elliptical image circle can achieve better pixel utilization than a traditional circular image circle.

Second Embodiment

Figure 6:
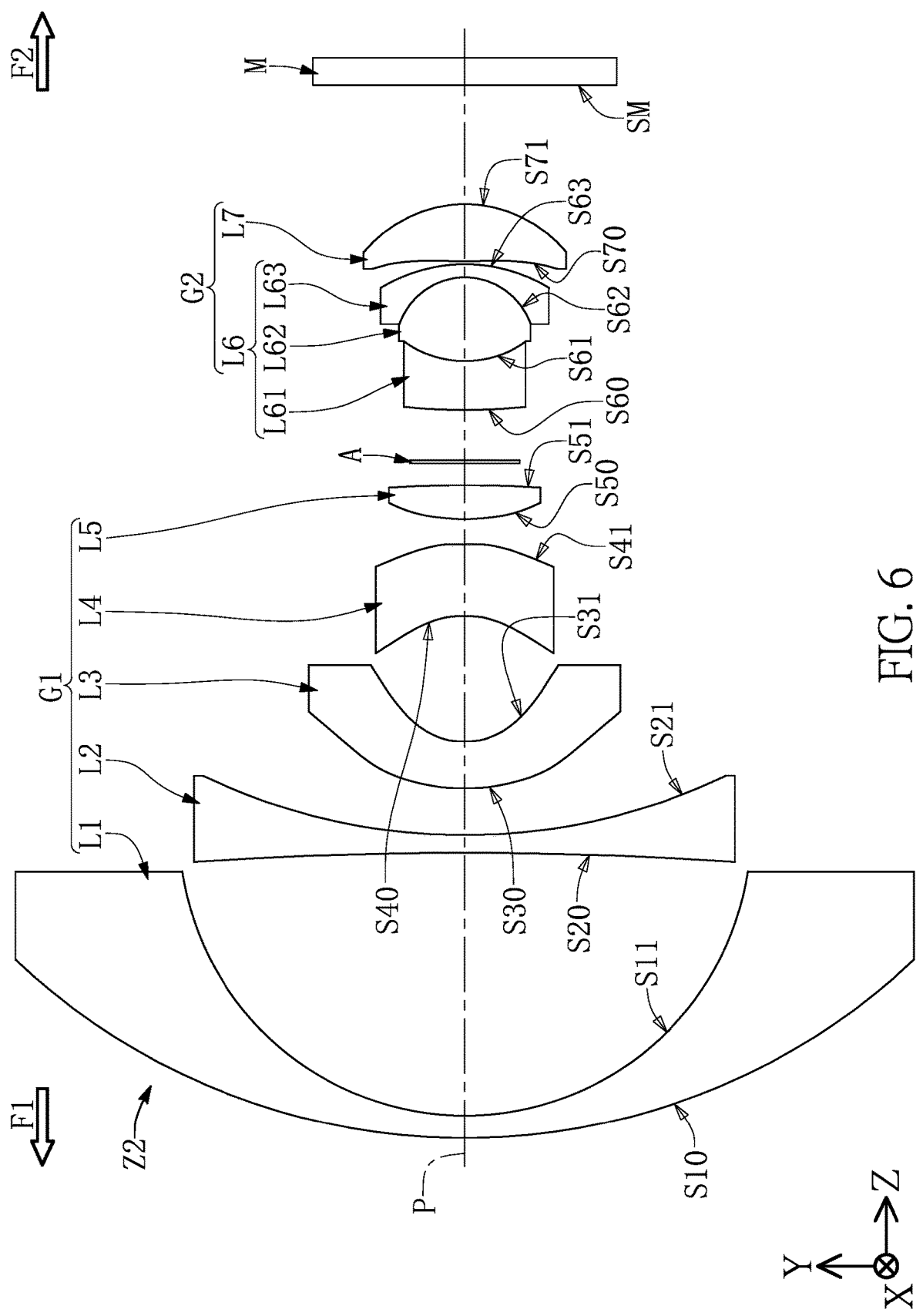
FIG. 6 is a schematic structural configuration diagram of the optical lens from one viewing angle according to a second embodiment of the present disclosure.
Figure 7:
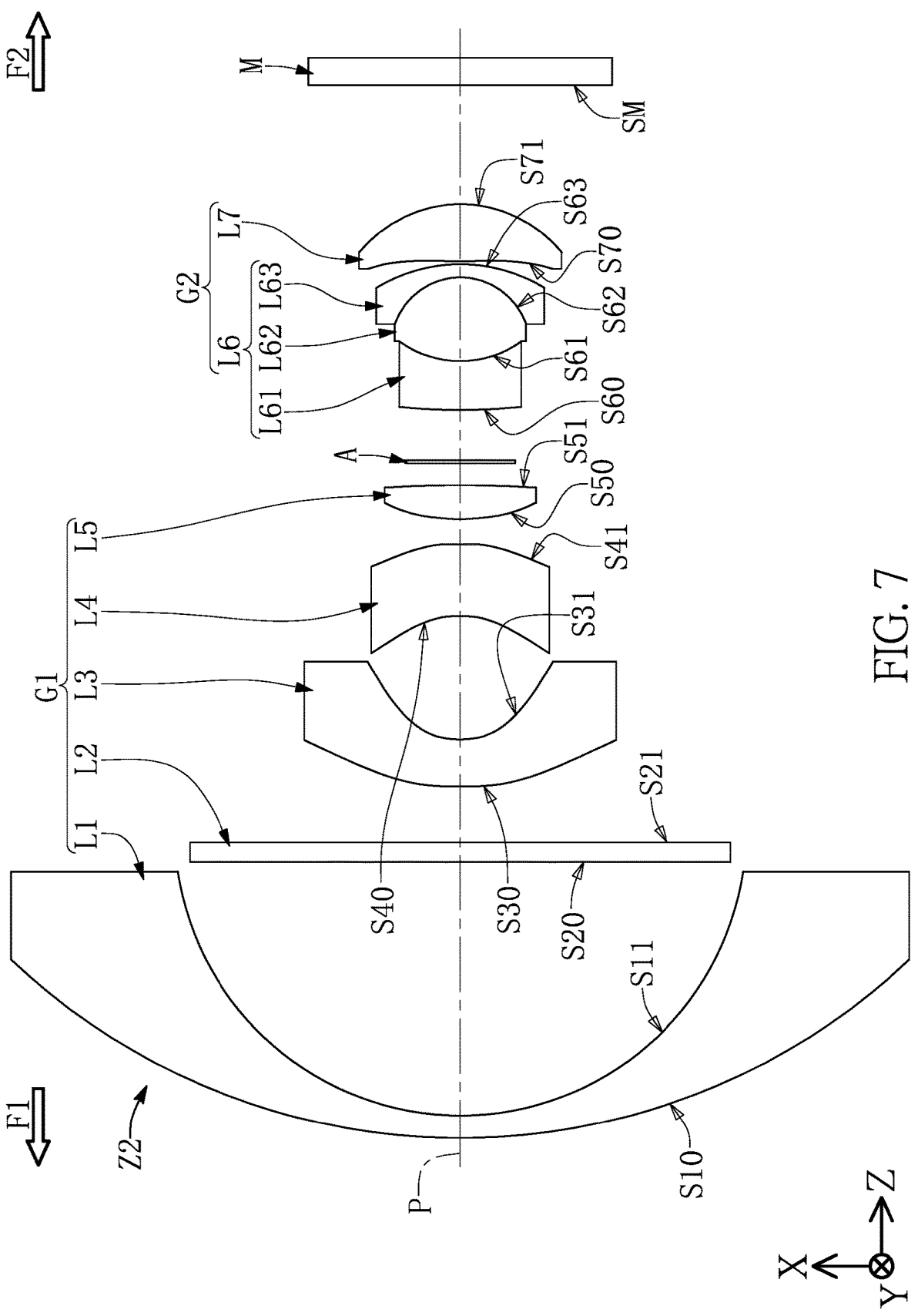
FIG. 7 is a schematic structural configuration diagram of the optical lens from another perspective according to the second embodiment of the present disclosure.

Reference is made to FIG. 6 and FIG. 7. FIG. 6 is a schematic structural configuration diagram of the optical lens from one viewing angle according to a second embodiment of the present disclosure, and FIG. 7 is a schematic structural configuration diagram of the optical lens from another perspective according to the second embodiment of the present disclosure. The optical lens Z2 of the present embodiment is substantially similar to the optical lens Z1 of the first embodiment. Therefore, the arrangement or operation of the same components will not be described again herein. The difference between the present embodiment and the first embodiment is that in the present embodiment, the third front lens L3 may be an anamorphic aspheric surface lens.

In the present embodiment, the actual design of each lens element of the optical lens Z2 can be seen in Table 5 below. The interpretation method of Table 5 is the same as that of Table 1, and will not be repeated herein.

TABLE 5

| surface | surface type | radius of curvature (mm) | thickness (mm) | material refractive index (Nd) | material Abbe number (Vd) |
|---|---|---|---|---|---|
| S10 | spherical surface | 22.6 | 0.60 | 2.008 | 25.46 |
| S11 | spherical surface | 9.5 | 7.87 | | |
| S20 | cylinder | −152.2 | 0.55 | 1.838 | 42.72 |
| S21 | cylinder | 21.4 | 1.68 | | |
| S30 | distorted aspherical Surface | 9.3 | 1.46 | 1.537 | 55.66 |
| S31 | distorted aspherical surface | 2.8 | 3.84 | | |
| S40 | aspherical | −3.3 | 2.20 | 1.537 | 55.66 |
| S41 | aspherical | −5.1 | 0.76 | | |
| S50 | spherical surface | 6.8 | 0.98 | 2.008 | 25.46 |
| S51 | spherical surface | −108.1 | 0.73 | | |
| aperture A | spherical surface | unlimited | 1.66 | | |
| S60 | spherical surface | 27.4 | 1.45 | 1.814 | 22.76 |
| S61 | spherical surface | 3.5 | 2.57 | 1.594 | 68.62 |
| S62 | spherical surface | −2.3 | 0.40 | 1.931 | 20.88 |
| S63 | spherical surface | −5.6 | 0.10 | | |
| S70 | aspherical | 59.0 | 1.79 | 1.537 | 55.66 |
| S71 | aspherical | −4.8 | 4.22 | | |
| SM | spherical surface | unlimited | | | |

Furthermore, Table 6 below lists the quadratic surface coefficient value K and the aspherical surface coefficients A to F of each order of the aspherical surfaces of the fourth front lens L4 and the second rear lens L7.

TABLE 6

| | | surface | | | |
|---|---|---|---|---|---|
| | | S40 | S41 | S70 | S71 |
| conic coefficient | K | −1.3 | −1.4 | −80.0 | 0.4 |
| aspheric coefficient | A | 2.74E−05 | 8.79E−04 | −2.82E−03 | −4.38E−04 |
| | B | −1.90E−04 | −3.68E−05 | −5.25E−05 | −1.06E−04 |
| | C | 3.59E−05 | 1.44E−05 | 2.45E−06 | 1.03E−05 |
| | D | −1.44E−06 | −4.73E−07 | 1.08E−07 | −8.00E−07 |
| | E | 0.0E+00 | 0 | 0 | 2.38E−08 |
| | F | 0.0E+00 | 0 | 0 | 0 |

Furthermore, the third front lens L3 (i.e., the distorted aspherical lens) of the optical lens Z2 of the present embodiment satisfies the following relationship:

$$Z = \frac{C_x X^2 + C_y Y^2}{1 + \sqrt{1 - (1 + K_x)(C_x^2 X^2) - (1 + K_y)(C_y^2 Y^2)}} + \tag{9}$$

$$AR[(1 - AP)X^2 + (1 + AP)Y^2]^2 + BR[(1 - BP)X^2 + (1 + BP)Y^2]^3 +$$

$$CR[(1 - CP)X^2 + (1 + CP)Y^2]^4 + DR[(1 - DP)X^2 + (1 + DP)Y^2]^5.$$

In the above relationship (9), $C_x$ can be the curvature in the X direction, $C_y$ can be the curvature in the Y direction, $K_x$ can be the cone coefficient in the X direction, $K_y$ can be the cone coefficient in the Y direction, X can be the distance in the X direction of the lens and Y can be the distance in the Y direction of the lens.

According to the above content, the aspherical surface of the third front lens L3 of the optical lens Z2 of the present disclosure can be seen in Table 7 below.

TABLE 7

| | S30 | S31 |
|---|---|---|
| X Curvature | 0.10 | 0.41 |
| Y Curvature | 0.11 | 0.35 |
| KY | 1.5 | −2.1 |
| AR | 3.70E−03 | 1.52E−02 |
| BR | −2.73E−04 | −2.80E−04 |
| CR | 7.21E−06 | −5.91E−05 |
| DR | −8.09E−08 | 3.07E−06 |
| KX | 1.83E+00 | −1.38E+00 |
| AP | 1.64E−01 | 8.03E−02 |
| BP | 2.30E−02 | 1.19E−01 |
| CP | −2.05E−02 | −8.04E−02 |
| DP | −3.79E−02 | −8.93E−02 |

In Table 7, AR, BR, CR, DR, AP, BP, CP and DP can be coefficients.

According to the above content, the imaging data in the vertical and horizontal directions of each half field of view angle of the optical lens Z2 of the present disclosure can be seen in Table 8 below. Therefore, the numerical value obtained by the optical lens Z2 of the present disclosure according to the relationship (4) is 1.01, and the numerical value obtained according to the relationship (5) is 1.59.

TABLE 8

| Half field of view angle (°) | Vertical direction (mm) | Horizontal direction (mm) |
|---|---|---|
| | .000 | .000 |
| 0 | .282 | .313 |
| 0 | .568 | .633 |
| 0 | .861 | .966 |
| 0 | .164 | .320 |
| 0 | .478 | .697 |
| 0 | .798 | .097 |
| 0 | .116 | .520 |
| 0 | .423 | .973 |
| 0 | .708 | .471 |

Reference is made to FIG. 3 and Table 8 again. In the present embodiment, when the half field of view angle of the optical lens Z2 is 10 degrees, the imaging width in the vertical direction can be 0.282 mm, and the imaging width in the horizontal direction can be 0.313 mm, and so on, and the imaging widths of other half field of view angles in the vertical and horizontal directions will not be described again.

It is worth noting that the optical lens Z2 of the present embodiment can also have a half field of view angle greater than 90° in both the horizontal and vertical directions, can cover a wide viewing angle, and satisfy the aforementioned relationships (1), (2), (3). In the present embodiment, various parameters of the optical lens Z2 are preferably as shown in Table 9 below, but the present disclosure is not limited thereto. Therefore, the numerical value obtained by the optical lens Z2 of the present disclosure according to the relationship (1) is 1.11, the numerical value obtained according to the relationship (2) is −7.3%, and the numerical value obtained according to the relationship (3) is 8.4%.

TABLE 9

| FLX | .788 | |
| FLY | .615 | |
| 2_X(F2X) | .00E+04 | .0% |
| 2_Y(F2Y) | 22.31 | 7.2% |
| 3_X(F3X) | 6.41 | 27.9% |
| 3_Y(F3Y) | 8.27 | 19.5% |

In addition, reference is made to FIG. 3, FIG. 4, FIG. 8 and FIG. 9, which are respectively the longitudinal aberration diagram of the optical lens Z1 of the first embodiment, the astigmatism field curve diagram and the distortion diagram of the optical lens Z1 of the first embodiment, the longitudinal aberration diagram of the optical lens Z1 of the second embodiment, and the astigmatism field curve diagram and distortion diagram of the optical lens Z1 of the second embodiment.

Figure 3:
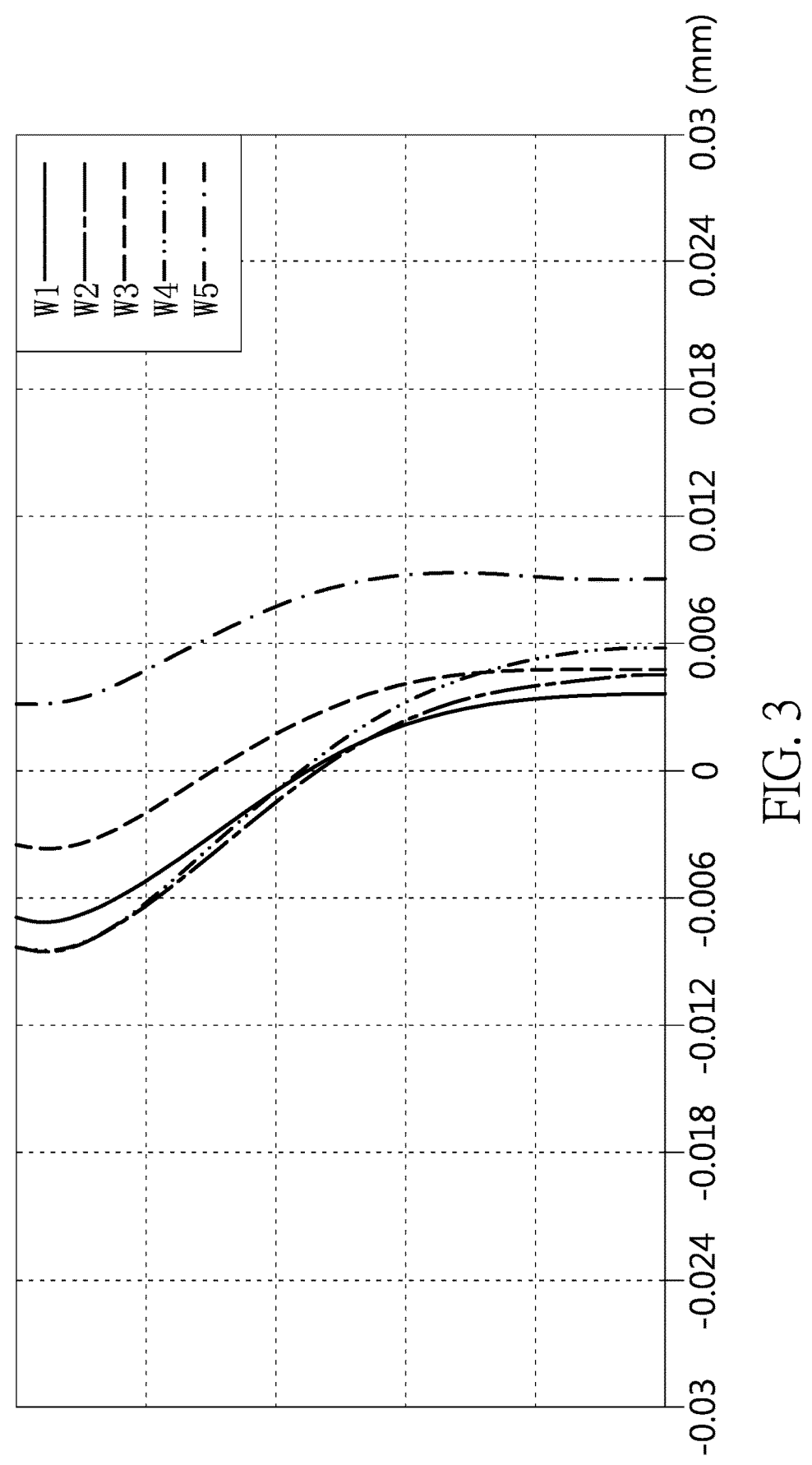
FIG. 3 is a longitudinal aberration diagram of the optical lens according to the first embodiment of the present disclosure.
Figure 4:
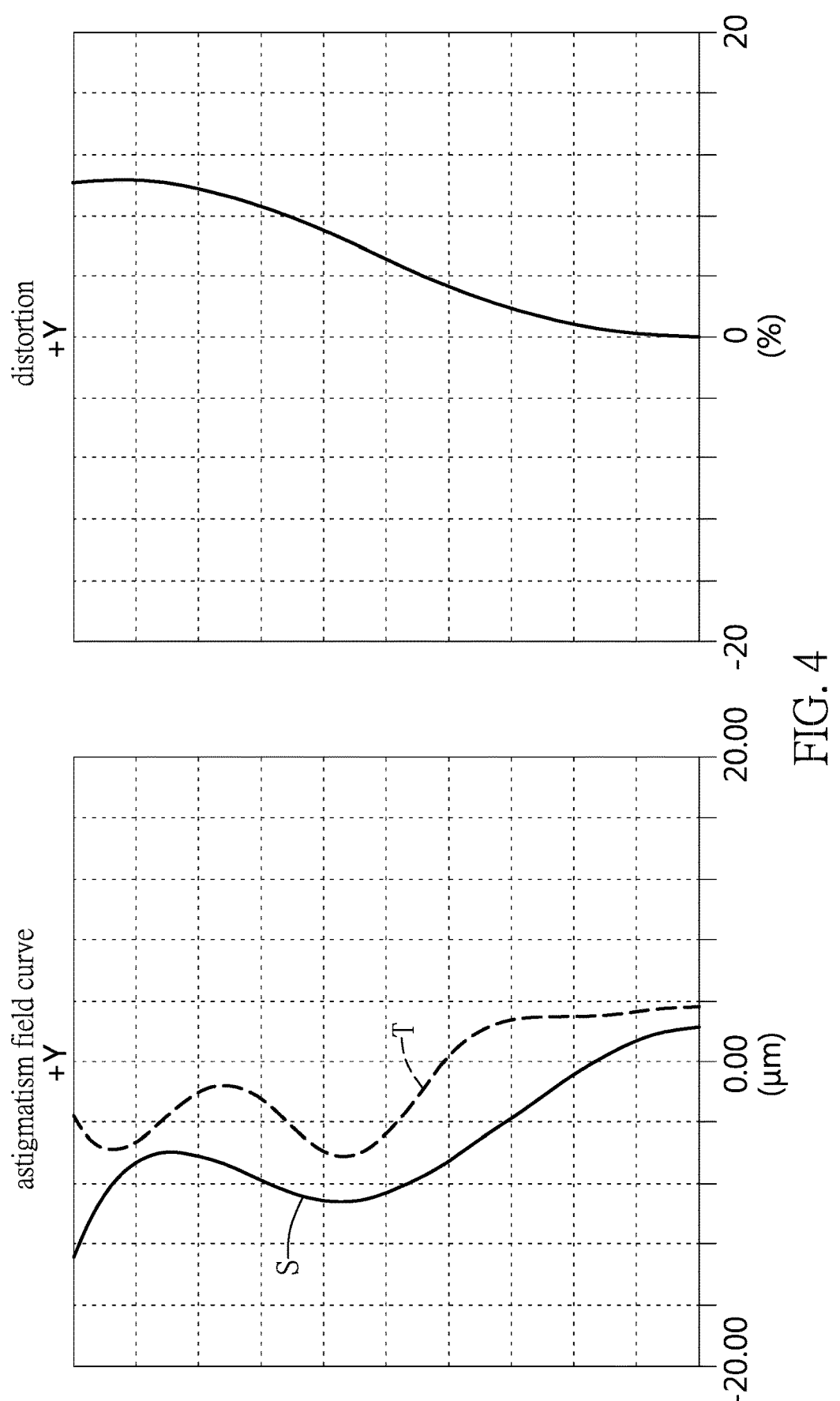
FIG. 4 is an astigmatism field curve diagram and a distortion diagram of the optical lens according to the first embodiment of the present disclosure.
Figure 8:
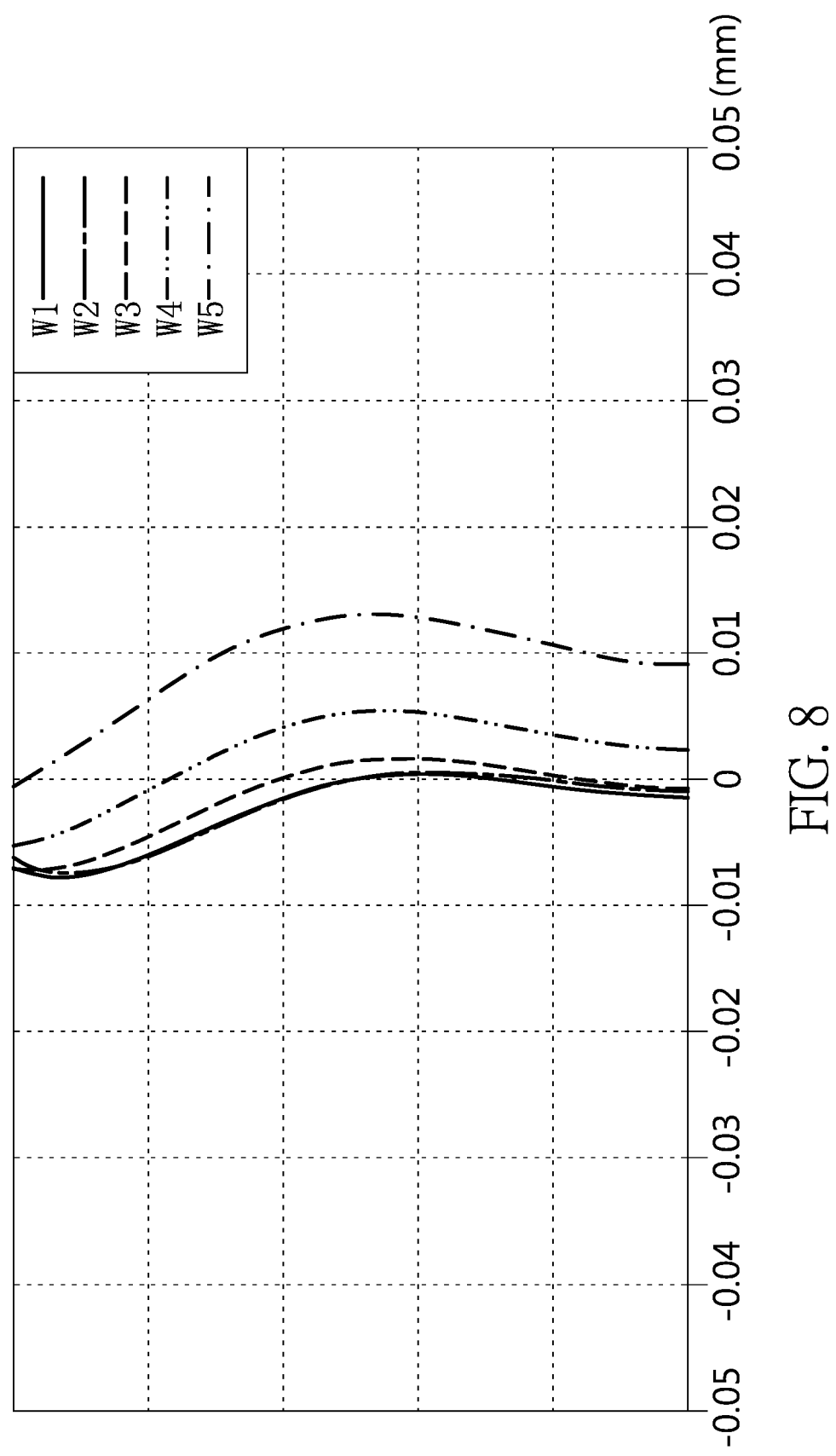
FIG. 8 is a longitudinal aberration diagram of the optical lens according to the second embodiment of the present disclosure.
Figure 9:
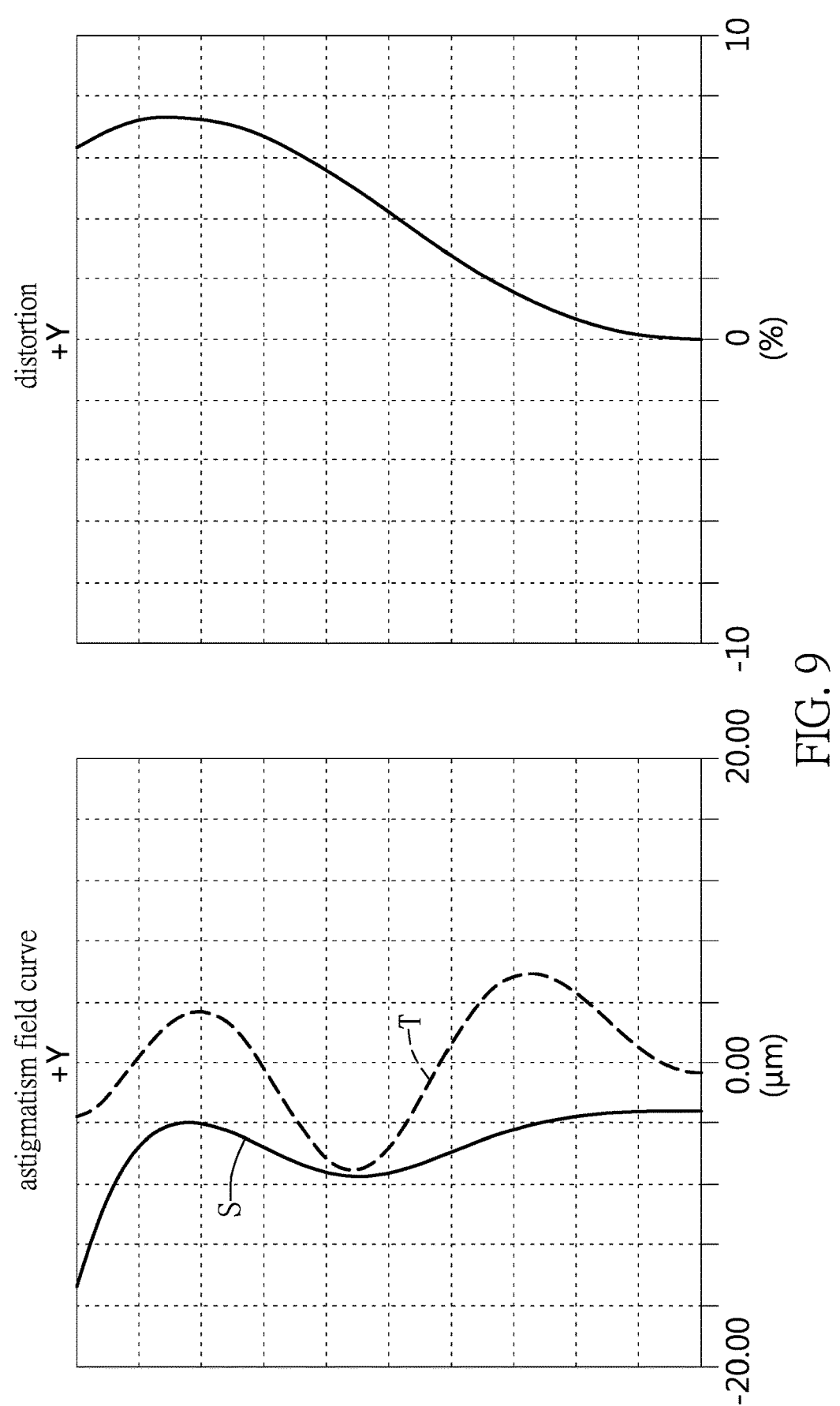
FIG. 9 is an astigmatism field curve diagram and a distortion diagram of the optical lens according to the second embodiment of the present disclosure.

FIG. 3 and FIG. 8 are respectively the longitudinal aberration diagrams of the optical lens (Z1, Z2), which show the longitudinal aberration (also known as axial aberration) of the intersection of the light rays with different pupil heights at each wavelength and the optical axis, and the horizontal aberration. The axis represents the distance (mm) from the image plane of different wavelengths to the intersection point of the light ray and the optical axis, the vertical axis represents the normalized entrance pupil height, and the different line segment styles represent the measurement situations at different wavelengths. The diagrams on the left in FIG. 4 and FIG. 9 are the astigmatic field curvature diagrams of the optical lens (Z1, Z2). The horizontal axis represents the focus displacement (mm), the vertical axis represents the image height, T represents the curve in the meridional direction, and S represents the curve in the sagittal direction. The right diagrams in FIG. 4 and FIG. 9 are the distortion diagrams of the optical lens (Z1, Z2), respectively. The horizontal axis represents the distortion percentage (%), the vertical axis represents the image height, and different line segment styles represent measurement situations at different wavelengths. Moreover, in FIG. 3, line W1 represents a wavelength of 555 nm, line W2 represents a wavelength of 610 nm, line W3 represents a wavelength of 510 nm, line W4 represents a wavelength of 650 nm, and line W5 represents a wavelength of 470 nm. In FIG. 8, line W1 represents the wavelength of 610 nm, line W2 represents the wavelength of 650 nm, line W3 represents the wavelength of 555 nm, line W4 represents the wavelength of 510 nm, and line W5 represents the wavelength of 470 nm. It can be observed that FIG. 2, FIG. 3, FIG. 5, FIG. 6, FIG. 8 and FIG. 9 show that the longitudinal aberration, astigmatism field curvature and distortion of the optical lens (Z1, Z2) of the present disclosure at a wavelength of 450 nanometers to 650 nanometers are all within the standard range, so that the optical lens (Z1, Z2) of the present disclosure provides good optical imaging quality.

However, the above example is only one of the possible embodiments and is not intended to limit the present disclosure.

Beneficial Effects of the Embodiment

One of the beneficial effects of the present disclosure is that an optical lens provided by the present disclosure can improve pixel utilization by virtue of the technical solution of "a front lens group G1 including a plurality of front lens elements sequentially arranged from an object side F1 to an image side F2, a second lens and a third lens in the plurality of front lens elements being non-rotationally symmetrical lenses, a rear lens group G2 including at least one rear lens element, the at least one rear lens element being a cemented lens, an aperture A located between the front lens group G1 and the rear lens group G2, a half field of view angle of the optical lens being greater than 90° in the horizontal direction and the vertical direction, and the optical lens satisfying the following relationships: EFLX/EFLY>1.1; EFLY/F2Y−EFLX/F2X<−5%; and EFLY/F3Y−EFLX/F3X>5%, in which EFLX is an effective focal length of the optical lens in a horizontal direction, EFLY is an effective focal length of the optical lens in a vertical direction, F2X is an effective focal length of the second lens in a horizontal direction, F2Y is an effective focal length of the second lens in a vertical direction, F3X is an effective focal length of the third lens in a horizontal direction, and F3Y is an effective focal length of the third lens in a vertical direction".

Furthermore, the optical lens (Z1, Z2) of the present disclosure uses the above technical solution to provide two non-rotationally symmetric lenses (i.e., the second front lens L2 and the third front lens L3), so that the EFL (the effective focal length of the optical lens (Z1, Z2) in the horizontal direction and the EFL (the effective focal length of the optical lens (Z1, Z2) in the vertical direction are different from each other, thereby achieving an elliptical image circle. Moreover, when the imaging element M adopts a rectangular shape, the optical lens (Z1, Z2) of the present disclosure can achieve better pixel utilization compared to the traditional fisheye lens using a circular image circle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical lens, including:

a front lens group including a plurality of front lens elements arranged sequentially from an object side to an image side, wherein a second lens and a third lens in the plurality of front lens elements are non-rotationally symmetrical lenses;

a rear lens group including at least one rear lens element, wherein the at least one rear lens element is a cemented lens; and an aperture located between the front lens group and the rear lens group;

wherein a half field of view angle of the optical lens is greater than 90° in a horizontal direction and a vertical direction, and the optical lens satisfies the following relationships: EFLX/EFLY>1.1; EFLY/F2Y−EFLX/F2X<−5%; and EFLY/F3Y−EFLX/F3X>5%;

wherein EFLX is an effective focal length of the optical lens in a horizontal direction, EFLY is an effective focal length of the optical lens in a vertical direction, F2X is an effective focal length of the second lens in a horizontal direction, F2Y is an effective focal length of the second lens in a vertical direction, F3X is an effective focal length of the third lens in a horizontal direction, and F3Y is an effective focal length of the third lens in a vertical direction.

2. The optical lens according to claim 1, wherein the plurality of front lens elements include a first front lens, a second front lens, a third front lens, a fourth front lens and a fifth front lens arranged sequentially from the object side to the image side, the second front lens and the third front lens are rotationally asymmetric lenses, the third front lens has a convex surface facing the object side, and the fourth front lens has a convex surface facing the image side.

3. The optical lens according to claim 2, wherein the first front lens and the fifth front lens are made of glass.

4. The optical lens according to claim 2, wherein the fourth front lens is an aspherical lens.

5. The optical lens according to claim 1, wherein the rear lens group includes a plurality of rear lens elements, the plurality of rear lens elements include a first rear lens and a second rear lens arranged sequentially from the object side to the image side, and the first rear lens is a cemented lens.

6. The optical lens according to claim 5, wherein the first rear lens includes a front lens piece, an intermediate lens and a rear lens piece, the front lens piece is connected to one side of the intermediate lens, and the rear lens piece is connected to another side of the intermediate lens.

7. The optical lens according to claim 5, wherein the second rear lens is an aspherical lens.

8. The optical lens according to claim 1, wherein the optical lens satisfies the following relationship:

$$H90/H10>1.3;$$

wherein H90 is an imaging width of a half field of view angle of 80°-90° in a horizontal direction, and H10 is an imaging width of a half field of view angle of 0°-10° in a horizontal direction.

9. The optical lens according to claim 1, wherein the optical lens satisfies the following relationship:

$$V90/V10>1.05;$$

wherein V90 is an imaging width with a half field of view angle of 80° to 90° in a vertical direction, and V10 is an imaging width with a half field of view angle of 0° to 10° in a vertical direction.

* * * * *